(12) United States Patent
Hada et al.

(10) Patent No.: US 10,248,095 B2
(45) Date of Patent: Apr. 2, 2019

(54) NUMERICAL CONTROL DEVICE HAVING IMPROVED SERVO CONTROL PERFORMANCE

(71) Applicant: FANUC CORPORATION, Yamanashi (JP)

(72) Inventors: Kouji Hada, Yamanashi (JP); Yoshito Miyazaki, Yamanashi (JP); Takaaki Komatsu, Yamanashi (JP); Akira Koizumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 307 days.

(21) Appl. No.: 15/353,911

(22) Filed: Nov. 17, 2016

(65) Prior Publication Data

US 2017/0146966 A1    May 25, 2017

(30) Foreign Application Priority Data

Nov. 19, 2015   (JP) .................. 2015-226631

(51) Int. Cl.
  *G05B 19/042*  (2006.01)
  *G05B 19/414*  (2006.01)

(52) U.S. Cl.
  CPC ..... *G05B 19/0421* (2013.01); *G05B 19/4148* (2013.01); *G05B 2219/34008* (2013.01); *G05B 2219/34013* (2013.01); *G05B 2219/34019* (2013.01); *G05B 2219/34047* (2013.01)

(58) Field of Classification Search
  CPC combination set(s) only.
  See application file for complete search history.

(56) References Cited

U.S. PATENT DOCUMENTS

2013/0253706 A1*  9/2013  Hada .................. G05B 19/18
                                                          700/275

FOREIGN PATENT DOCUMENTS

| JP | 9-160613 A    | 6/1997  |
| JP | 2834122 B2    | 12/1998 |
| JP | 2003-316408 A | 11/2003 |
| JP | 2013-054730 A | 3/2013  |
| JP | 2013-208772 A | 10/2013 |
| JP | 2014-144494 A | 8/2014  |
| JP | 2014-211721 A | 11/2014 |

* cited by examiner

*Primary Examiner* — Ratisha Mehta
(74) *Attorney, Agent, or Firm* — Hauptman Ham, LLP

(57) ABSTRACT

A numerical control device includes a multicore CPU for outputting a position command value of a servomotor, an ASIC including a servo controller, which outputs a current command value to an amplifier for driving the servomotor, and another processor, and a DSP for reading the position command value and controlling the servomotor such that the servomotor moves to a position indicated by the position command value. The CPU and the ASIC are connected through a plurality of serial interfaces.

10 Claims, 6 Drawing Sheets

NUMERICAL CONTROL DEVICE HAVING IMPROVED SERVO CONTROL PERFORMANCE

This application is a new U.S. patent application that claims benefit of JP 2015-226631 filed on Nov. 19, 2015, the content of 2015-226631 is incorporated herein by reference.

BACKGROUND OF THE INVENTION

1. Field of the Invention

The present invention relates to a numerical control device used in motor control, robot control, and the like, and specifically relates to a numerical control device having improved servo control performance.

2. Description of Related Art

Numerical control devices are used in computer numerical control (CNC) for controlling machine tools. Robot controllers, which control a motor in a robot, have a configuration similar to the numerical control devices for the CNC. A numerical control device according to the present invention is not limited to a numerical control device for the CNC, but includes a robot controller.

To manufacture the numerical control devices, a main controller for overall control, a programmable logic controller (PLC) having a sequence function to control the input and output of signals to and from a machine, a servo controller to input and output signals to and from a servomotor through a servo interface, and a digital signal processor (DSP) for performing arithmetic processing on a servo control signal are connected to the other components of the device at data input-output (I/O) interfaces, user interfaces, peripheral device interfaces, and the like through a parallel data bus (hereinafter sometimes abbreviated by bus), to establish communications among the components. Since the bus is large in wiring size and bus interfaces (bus bridges) for inputting and outputting signals between each component and the bus are also large in size, the numerical control device conventionally has one parallel bus system.

The numerical control devices must have a configuration that sufficiently meets required specifications, with consideration of costs. At this time, it is desirable to consider improvement in the performance of the components to be used, a change in a delivery system of the components, and the like. To manufacture the numerical control devices, a general-purpose processor (CPU) and DSP are commonly used to form the main controller and the PLC. On the other hand, reducing the number of the components is effective at reducing the costs, and therefore the components other than the CPU and the DSP, i.e., the servo controller and the other circuits are integrated into a single integrated circuit (IC). Such an IC is referred to as an application specific integrated circuit (ASIC). When the components other than the CPU and the DSP are integrated into the ASIC in the above configuration having the bus, the CPU, the DSP, and the ASIC are connected to the bus, and the bus is included in the ASIC. Furthermore, multicore CPUs and serial interfaces have been developed. The main controller and the PLC can be easily configured in one multicore CPU. In the configuration having the CPU and the ASIC, when a high speed serial interface such as PCI Express™ or the like substitutes for the bus, communications between the CPU and the ASIC are performed through the serial interface, while communications in the ASIC are performed through the bus.

It is important for communications in the numerical control device to secure communication performance between the main controller (in the CPU) and the servo controller (in the ASIC). The communication performance exerts an influence on the performance of an object to be controlled such as a machine or a robot.

As a technique associated with an increase in the speed and performance of a numerical control device, the following proposals are described (for example, Japanese Unexamined Patent Publication (Kokai) No. 2003-316408 (hereinafter called "patent document 1") and Japanese Unexamined Patent Publication (Kokai) No. 2013-054730 (hereinafter called "patent document 2")). The patent document 1 discloses an example in which one CPU processes low volume data that has direct effect on the processing speed, I/O among components of a machine tool, and the like, while another CPU processes high volume data that has no direct effect on the processing speed. The former is driven by an operating system that has a low data processing capacity and a high processing speed, while the latter is driven by an operating system that has a high data processing capacity and a low processing speed. Such a configuration allows for controlling the machine tool at a high speed and with high performance (for example, refer to paragraph [0017] and FIG. 3). Also, the relationship between a data processing capacity and a processing time, relative to the contents of processed data, is described (for example, refer to paragraph [0016] and FIG. 2).

The patent document 1 also discloses that a second CPU reads and processes data stored in an information sharing unit at a high speed, and generates a control signal from the processed data to control a servomotor (refer to paragraph [0026]).

The patent document 2 describes an example of a configuration in which a multicore DSP constitutes a motor control processor in a motor controller, and is connected to a motor control amplifier through a high speed serial communication interface (refer to paragraphs to [0018] and FIG. 1). A multicore CPU has the functions of numerical control, motor control, and PLC, and connected to a bus bridge, which also has the function of communication control, through a high speed serial communication interface.

However, the above conventional art cannot prevent performance degradation owing to communications through the bus. For example, in the numerical control device, data associated with servo control among the servo controller, the CPU, and the DSP is transferred at certain intervals. Input-output (I/O) data is also transferred at certain intervals. The transfers are required to be processed within a predetermined time period from the occurrence. A device connected to a peripheral, which inputs and outputs external signals, has to read and monitor data associated with a state of the peripheral at certain intervals. Furthermore, program data read from a storage device and an interrupt signal from the device connected to the peripheral to the CPU have to be transferred not at certain intervals but within a predetermined time period.

To design the numerical control device, the amount of communication (transfer) traffic of data other than servo control data and I/O data is predicted, and the amount of communication traffic of the servo control data and the I/O data is determined while maintaining a certain amount of margin. As a result of maintaining a certain amount of margin, it is difficult to increase the communication traffic of the servo control data and the I/O data to its limit. To improve the performance of an object controlled by the numerical control device, the communication traffic of the servo control data and the I/O data must be increased but cannot for this reason. Also, since the circuit design becomes difficult, the communication traffic is reduced while performance degradation is partially allowed.

SUMMARY OF THE INVENTION

The present invention aims at providing a numerical control device that can eliminate communication performance degradation owing to a bus in a configuration having a CPU and an integrated circuit (ASIC), and thereby improve servo control performance.

A numerical control device according to the present invention includes a CPU for outputting a position command value of a servomotor; an integrated circuit including a servo controller for outputting a current command value to an amplifier for driving the servomotor, and another processor; and a DSP for reading the position command value and controlling the servomotor such that the servomotor moves to a position indicated by the position command value. The CPU and the integrated circuit are connected through a plurality of serial interfaces. The integrated circuit has a first internal bus connected to one of the plurality of serial interfaces, and a second internal bus connected to another one of the plurality of serial interfaces. The servo controller is connected to the first internal bus, and the other processor is connected to the second internal bus.

BRIEF DESCRIPTION OF THE DRAWINGS

The objects, features, and advantages of the present invention will be more apparent from the following description of embodiments in conjunction with the attached drawings, wherein.

DETAILED DESCRIPTION OF THE INVENTION

A numerical control device according to the present invention will be described below with reference to the drawings.

First Embodiment

Figure 1:
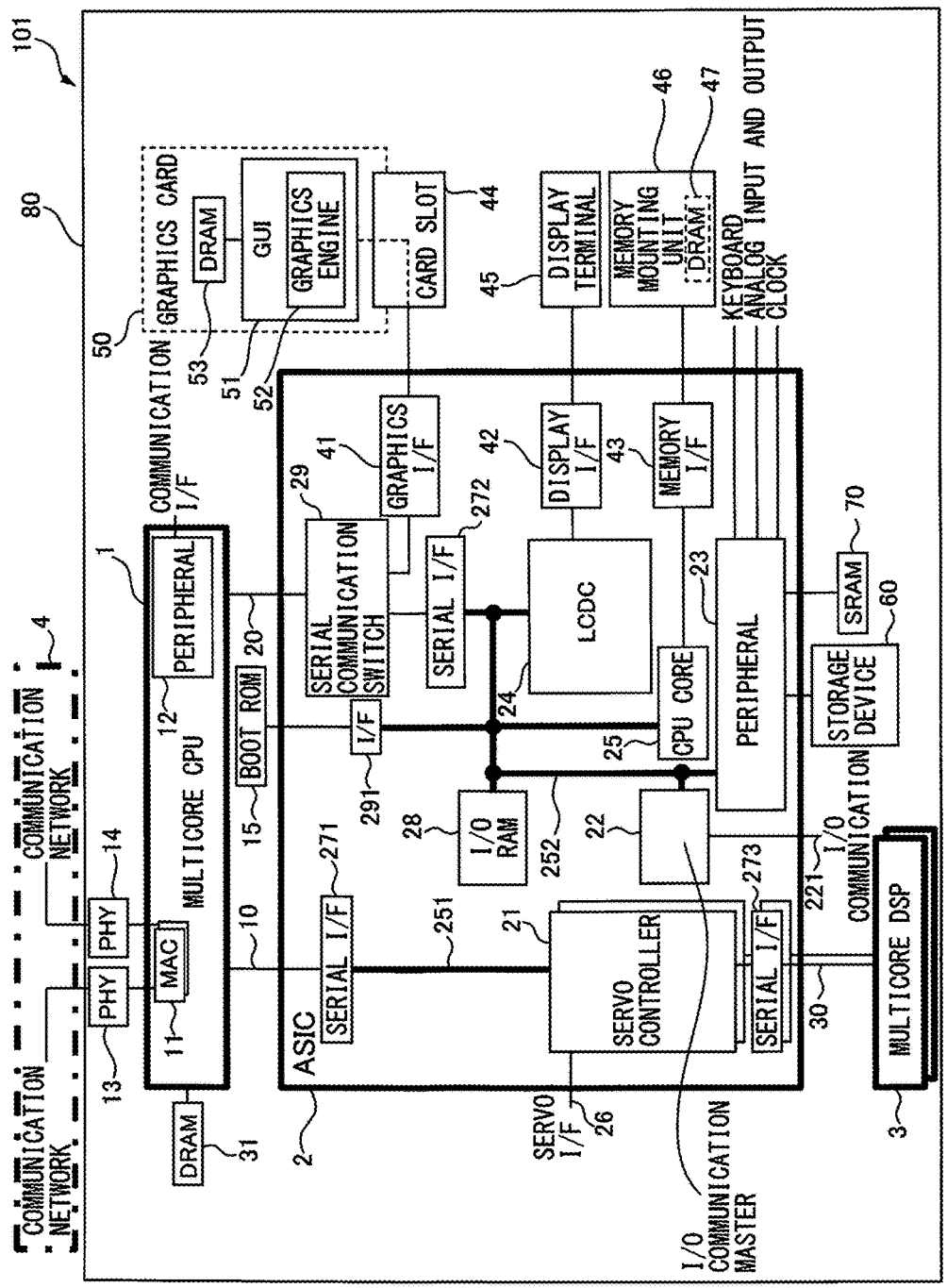
FIG. 1 is a block diagram of a numerical control device according to a first embodiment of the present invention.

A numerical control device according to a first embodiment of the present invention will be described. FIG. 1 is a block diagram of the numerical control device according to the first embodiment of the present invention. A numerical control device 101 according to the first embodiment of the present invention has a control circuit board 80 having a multicore CPU 1, an ASIC 2, and a multicore DSP 3 mounted thereon. The multicore CPU 1 and the ASIC 2 are connected through two high-speed serial interface lines 10 and 20. The ASIC 2 and the multicore DSP 3 are connected through a high-speed serial interface line 30. The high-speed serial interface lines 10, 20, and 30 may be, for example, PCI Express™ buses, but are not limited thereto. The control circuit board 80 is further provided with a card slot 44, a display terminal 45, a memory mounting unit 46, and physical layers (PHYs) 13 and 14 for establishing communications with a network. The memory mounting unit 46 can be provided with a DRAM 47. The memory mounting unit 46 is constituted of a socket to mount a DRAM module therein, a component footprint to directly mount a DRAM module on the control circuit board 80, or the like. In FIG. 1, the multicore CPU 1 and the ASIC 2 are connected through the two high-speed serial interface lines 10 and 20, but may be connected through three or more high-speed serial interface lines.

The multicore CPU 1 includes a media access controller (MAC) 11 and a peripheral 12. The media access controller 11 establishes communications with the network through the physical layers (PHYs) 13 and 14. The network is, for example, a multi-function Ethernet™. The "multi-function" Ethernet refers to Ethernet™ that is usable in various industries. However, the network is not limited to this. In this embodiment, as shown in FIG. 1, a DRAM 31, which functions as a main memory for the CPU, is externally connected to the multicore CPU 1, but may be externally connected to the ASIC 2.

The ASIC 2 includes a servo controller 21, an I/O communication master 22, a peripheral 23, a liquid crystal display controller (LCDC) 24, a CPU core 25, an I/O RAM 28, a serial communication switch 29, a graphics interface 41, a display interface 42, a memory interface 43, serial interfaces 271-273, another interface 291, a first ASIC internal bus 251, and a second ASIC internal bus 252. The servo controller 21 and the serial interface 271 are connected through the first ASIC internal bus 251.

The servo controller 21 is connected to the multicore DSP 3 through the serial interface 273 and the high-speed serial interface line 30. The serial interface 271 is connected to the multicore CPU 1 through the high-speed serial interface line 10.

The I/O communication master 22, the peripheral 23, the LCDC 24, the CPU core 25, the I/O RAM 28, the serial interface 272, and the interface 291 are connected to the second ASIC internal bus 252. The serial communication switch 29 is connected to the multicore CPU 1 through the high-speed serial interface line 20. Furthermore, the serial communication switch 29 is connected through the graphics interface 41 to the card slot 44 in which a graphics card 50 having an advanced graphics unit is installed, as well as connected to the serial interface 272.

The graphics card 50 has a GUI (graphical user interface) CPU 51 and a DRAM 53. The DRAM 53 is connected to the GUI CPU 51. The GUI CPU 51 configures a graphics engine 52, which provides an advanced graphical user interface by software, based on a command from the multicore CPU 1. Furthermore, the GUI CPU 51 runs an application developed by a user, and the like. The DRAM 53 is a working memory for the GUI CPU 51. The graphics engine 52 is connected to a display device e.g. a liquid crystal display via an LCD interface such as VGA, SVGA, XGA, or SXGA.

When the graphics card 50 is connected, the address of the graphics card 50 is registered in the multicore CPU 1. The serial communication switch 29 causes the high-speed serial interface line 20 to branch to the serial interface 272 and to the graphics interface 41. When the output of the multicore CPU 1 indicates the address of a component connected to the second ASIC internal bus 252, the serial communication switch 29 connects the high-speed serial interface line 20 to the serial interface 272. When the output of the multicore CPU 1 indicates the address of a component mounted on the graphics card 50, the serial communication switch 29 connects the high-speed serial interface line 20 to the graphics interface 41.

The I/O communication master 22 is a circuit for controlling I/O communication. To the I/O communication master 22, a slave unit (not shown) for inputting and outputting data DI/DO is connected through an external I/O interface terminal 221. The I/O communication master 22 outputs the data DO stored in the I/O RAM 28 to the slave unit. On the other hand, the data DI inputted from the slave unit is stored as data DI in the I/O RAM 28 through the I/O communication master 22. The data DI/DO stored in the I/O RAM 28 is read and written by a sequence program executed on the multicore CPU 1 through the high-speed serial interface line 20, the serial communication switch 29, the serial interface 272, and the second ASIC internal bus 252. Note that, instead of providing the I/O RAM 28, the DRAM 31 may be used as memory for storing I/O data inputted and outputted by the I/O communication master 22. Alternatively, another RAM may be connected to the ASIC 2, and used as the I/O RAM 28 and a working memory of the ASIC 2.

To the peripheral 23, a storage device 60 storing CNC software and an SRAM 70 backed up with a battery are connected. The SRAM 70 is used for storing data during operation, so that the device is recoverable to its original state even if power is turned off. Furthermore, the peripheral 23 has external interface terminals for a keyboard, analog inputs and outputs, and a clock. Using these terminals, user's inputs, a signal input to skip a processing program during execution, signal inputs from a touch sensor, a clock input, an analog spindle output (analog output), and the like are performed.

The LCDC 24 is constituted of a VRAM for storing screen image data and a controller (LCDC) for outputting the data stored in the VRAM to the display device such as the liquid crystal display. The LCDC 24 is connected to the display terminal 45 through the display interface 42. In one aspect of the first embodiment, the CPU core 25 performs a graphics function using the DRAM 47 provided in the memory mounting unit 46 mounted on the control circuit board 80, and writes screen image data to the VRAM.

An externally connected boot ROM 15 is connected to the second ASIC internal bus 252 through the interface 291. The boot ROM 15 is a ROM for storing boot loader software. The multicore CPU 1 reads the boot ROM 15 and initializes itself upon actuation. In the initialization, software stored in the storage device 60 connected to the peripheral 23 is loaded into the DRAM 31.

As described above, the multicore CPU 1 and the ASIC 2 are connected through the plurality of high-speed serial interface lines 10 and 20, and one of the plurality of high-speed serial interface lines, i.e., the high-speed serial interface line 10 is connected to the first ASIC internal bus 251 to which the servo controller 21 is connected.

Next, servo control will be described. The multicore CPU 1 outputs a position command value of a servomotor (not shown) to the servo controller 21 in the ASIC 2. The servo controller 21 outputs a current command value to an amplifier (not shown) that drives the servomotor. The multicore DSP 3 reads the position command value, and controls the servomotor such that the servomotor moves to a position indicated by the position command value.

The servo controller 21 is provided with a servo interface 26. The servo interface 26 is an interface to connect a servo amplifier or a spindle amplifier to the servo controller 21. To the servo amplifier or the spindle amplifier, a power line of the servomotor or a spindle motor, which operates each axis of a machine tool, and a feedback input line to detect the position and speed of each motor are connected.

The position command value from the multicore CPU 1 is written to an internal RAM area of the servo controller 21. The multicore DSP 3 reads the position command value, and controls the servomotor such that the servomotor moves to the position indicated by the position command value. The servomotor is controlled through the servo interface 26 connected to the servo controller 21.

The servo controller 21 transmits the current command value to the amplifier through the servo interface 26. The amplifier controls a current using a PWM signal based on the received current command value, and transmits the value of a current sensor contained in the amplifier to the servo controller 21 through the servo interface 26. A feedback signal from the servomotor is also transmitted to the servo controller 21 through the servo interface 26. The multicore DSP 3 transmits the next current control command value to the amplifier through the servo interface 26 based on the received value of the current sensor and the value of the feedback signal. The multicore DSP 3 controls the servomotor by the repetition of current control, so as to make each axis reach the position indicated by the multicore CPU 1. The multicore DSP 3 writes the value of the feedback signal to the servo controller 21. The multicore CPU 1 reads this value, and determines that the axis has reached the position indicated by the position command value.

In the numerical control device 101 according to the first embodiment, as shown in FIG. 1, when the DRAM 47 is not mounted on the memory mounting unit 46 and the graphics card 50 is not installed, a low-end simple display function is performed. The multicore CPU 1 generates rendering data. The generated rendering data is transmitted to the LCDC 24, and the LCDC 24 expands an image in the VRAM based on the rendering data. The image data expanded in the VRAM is converted into a signal in a format that is compatible with the interface (for example, SVGA or XGA) of the connected liquid crystal display, outputted through the display interface 42 and the display terminal 45, and displayed on the liquid crystal display.

In the above embodiment, the multicore CPU 1 generates the rendering data. Since the multicore CPU 1 generates the rendering data between processes as a main controller and a PLC, it is difficult to generate large scale rendering data or rendering data requiring high computing power, such as 3D rendering data. Thus, although there is a limit to the rendering data which can be generated, this configuration is achievable at a low cost. In the numerical control device 101 according to the first embodiment, communications between the servo controller 21 and the multicore CPU 1 and communications between the LCDC 24 and the multicore CPU 1 are separated using the two internal buses and the two high-speed serial interfaces, thus preventing communication performance degradation of a servo owing to a bus.

Furthermore, when the DRAM 47 is connected to the memory mounting unit 46 on the control circuit board 80 as a working memory of the CPU core 25, the CPU core 25 generates rendering data. The generated rendering data is transmitted to the LCDC 24. The LCDC 24 expands an image in the VRAM based on the rendering data. Since the dedicated CPU core 25, instead of the multicore CPU 1, generates the rendering data, the generated rendering data has improved quality. Also, since the multicore CPU 1 does not need to generate the rendering data, the multicore CPU 1 has more time for the processing as the main controller and the PLC. In this manner, the rendering data of a different level (middle-end) can be generated using the same ASIC 2 having the servo controller 21 therein.

Especially, preventing the communication performance degradation owing to a bus can eliminate the need for predicting the amount of communication (transfer) traffic of data other than servo control data and I/O data, and determining the amount of communication traffic of the servo control data and the I/O data while maintaining some margin. In other words, it becomes possible to determine the amount of communication traffic of the data other than the servo control data and the I/O data, irrespective of the amount of communication traffic of the servo control data and the I/O data. Since both quantities of communication traffic can be determined independently of each other, the same multicore CPU 1 does not need to process the servo control data, the I/O data, and graphics data. The separate CPU core 25 can process the graphics data.

Furthermore, installing the graphics card 50 in the card slot 44 on the control circuit board 80, without mounting the DRAM 47, provides the function of a high-performance (high-end) rendering, as described above.

Figure 2:
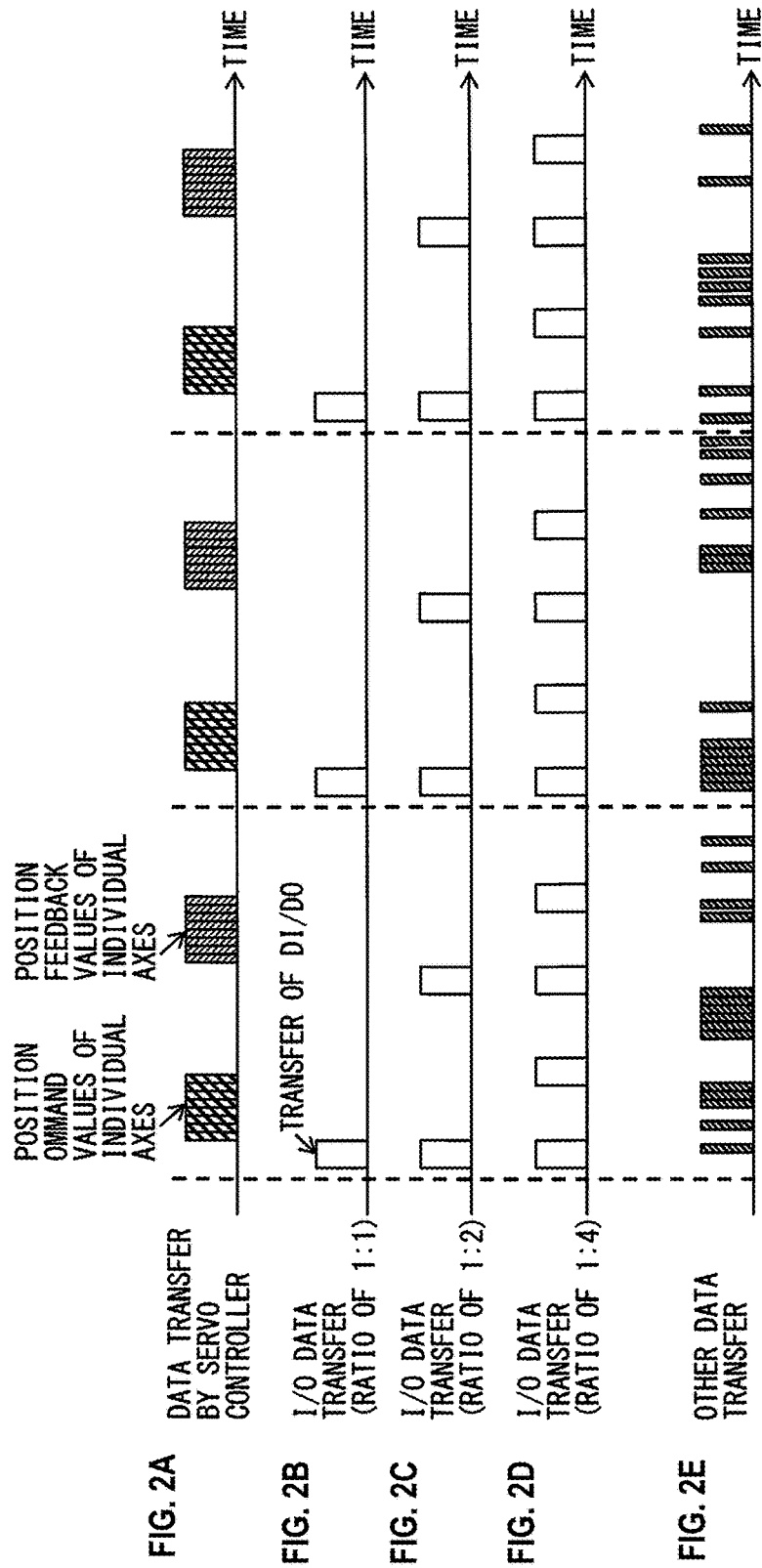
FIGS. 2A to 2E show a timing chart of data transfers in the numerical control device according to the first embodiment of the present invention.

FIGS. 2A to 2E show a timing chart of data transfers by the servo controller 21 and the I/O communication master 22 in the numerical control device 101 according to the first embodiment of the present invention. FIG. 2A is a timing chart of the position command values and the position feedback values of the individual axes of the servomotor. Servo control data including the position command values and the position feedback values of the individual axes is transferred through the high-speed serial interface line 10, the serial interface 271, and the first ASIC internal bus 251. The servo controller 21 transfers the position command values and the position feedback values of the individual axes to the multicore CPU 1 within a certain period of time. The position command values and the position feedback values are transferred with a lag of an approximately half period.

The I/O data is periodically transferred at a ratio of 1:n relative to the transfer period of the servo control data. A transfer period n is settable, and a transfer duration in each period depends on the transfer period n. FIGS. 2B to 2D show transfers of the I/O data with transfer periods of 1:1, 1:2, and 1:4, respectively. FIG. 2E shows transfers of the other data. The other data is transferred at random at a timing that is independent of the transfer period of the servo control data. The I/O data and the other data are transferred through the high-speed serial interface line 20, the serial communication switch 29, the serial interface 272, and the second ASIC internal bus 252.

Transfers of the servo control data occur at certain intervals, while transfers of the I/O data occur at other certain intervals. The transfers of the servo control data and the I/O data are each required to be processed within a predetermined time period after the occurrence. In addition, a device connected to a peripheral, which inputs and outputs external signals, has to read and monitor data associated with a state of the peripheral at certain intervals. Furthermore, program data read from the storage device and interrupt signal from the device connected to the peripheral to the CPU have to be transferred not at certain intervals but within a predetermined time period. In the numerical control device 101 according to the first embodiment, since the servo control data is transferred through the high-speed serial interface line 10, the transfers of the servo control data are not affected by the transfers of the other data. The I/O data and the other data are transferred through the high-speed serial interface line 20. However, the transfer duration of the I/O data is limited, so the other data can be transferred between the transfers of the I/O data. Therefore, it is possible to easily control transfer timing so as to complete the transfers within the above predetermined time period. The LCDC 24 and the CPU core 25 may provide a more advanced graphics function, in a case where the high-speed serial interface line 20 can afford to transfer more graphics data.

For example, assuming that the multicore CPU 1 and the ASIC 2 are connected through one high-speed serial interface line, and one ASIC internal bus is provided in the ASIC 2, just in the case of the numerical control device of the conventional art, communications of the servo control data are regarded as periodic transfers. When transfers of the other data are mixed, the amount of communication traffic between the multicore CPU 1 and the servo controller 21 has to be determined in consideration of an allowance for interruptions by the other communications, thus causing complicated control and limitations in performance. On the contrary, in the numerical control device according to the first embodiment of the present invention, the communication performance between the multicore CPU 1 and the servo controller 21 can be improved, thus maximizing communication bandwidth between the multicore CPU 1 and the servo controller 21. Also, the communication performance between the multicore CPU 1 and the other processor is improved. This is achieved for the first time, when the multicore CPU 1 and the ASIC 2 are connected through the two high-speed serial interface lines 10 and 20, and the two ASIC internal buses i.e. the first ASIC internal bus 251 and the second ASIC internal bus 252 are provided separately in the ASIC 2.

Furthermore, separating the communication between the multicore CPU 1 and the servo controller 21 resolves a problem associated with communication bandwidth, but contrarily, the main controller has to process two communications at a time. Thus, a single core CPU cannot provide sufficient effects caused by the independence of communications. In the first embodiment, the main controller is constituted of the multicore CPU 1, and independent CPU cores can be assigned to the two independent communications. For example, when the multicore CPU 1 has four cores, two cores are assigned to servo control, while the other two cores are assigned to the other control. Assigning the specific core to each of the independent communications, as described above, allows for maximizing communication bandwidth in the independent communication. Note that, a multicore thread CPU can also be used. Also in this case, a part of a thread may be assigned to the servo control, while the remaining thread may be assigned to the other control.

As described above, the numerical control device according to the first embodiment can increase graphics scalability corresponding to different quality levels using a common architecture, without affecting the servo control. The low-end configuration is made at the lowest cost, because the DRAM 47 is not connected to the CPU core 25. The middle-end configuration is made at a middle cost, because the GUI CPU 51 of the graphics card 50 becomes unnecessary. Also, since the multicore CPU 1 is free from the rendering process, the CNC performance is improved. The high-end configuration requires a high cost due to the use of the graphics card 50 having the GUI CPU 51, but has the highest rendering performance. Also, since the multicore CPU 1 and the CPU core 25 in the ASIC 2 are free from the rendering process, the CNC performance is improved.

Second Embodiment

Figure 3:
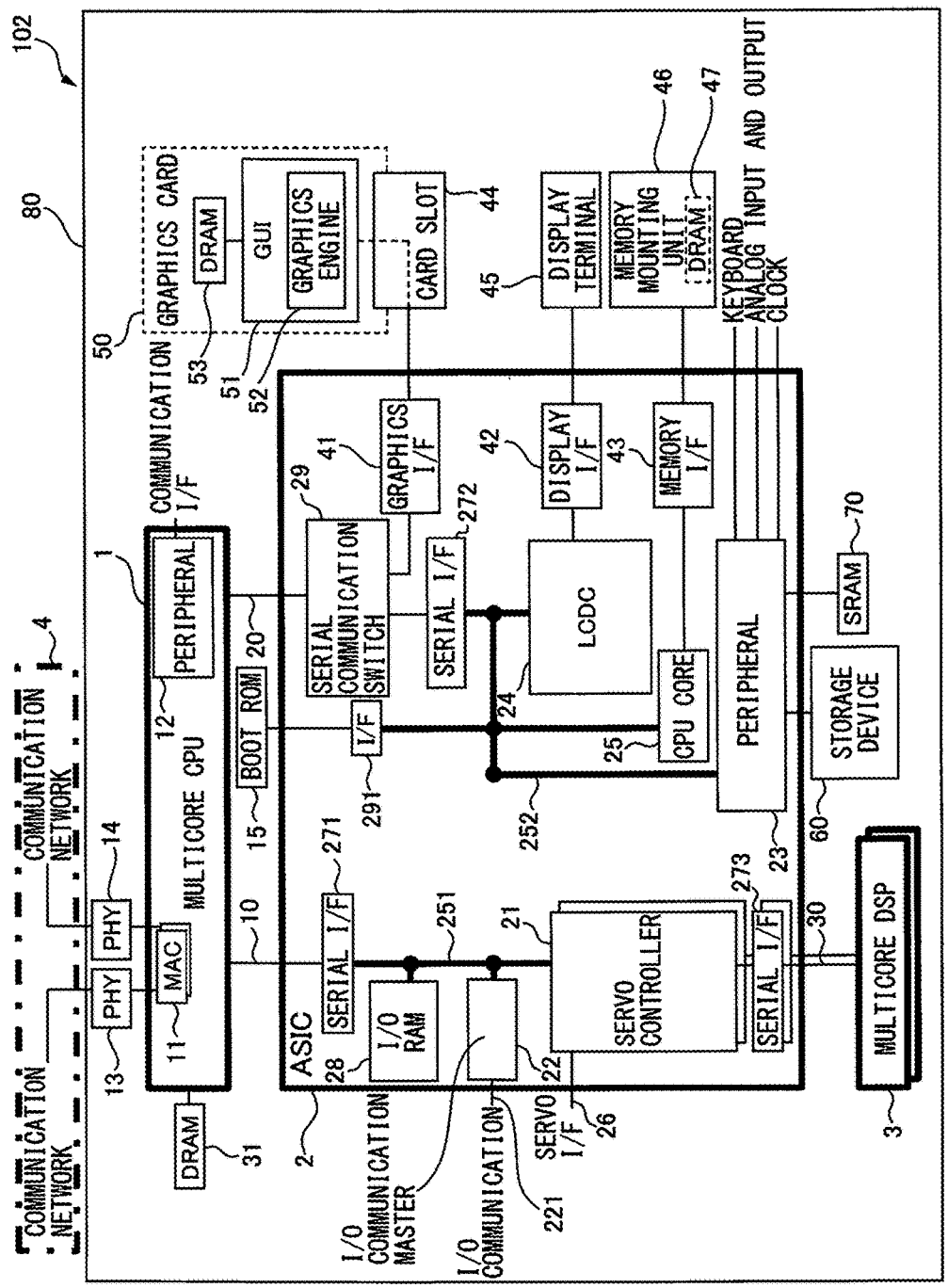
FIG. 3 is a block diagram of a numerical control device according to a second embodiment of the present invention.

Next, a numerical control device according to a second embodiment of the present invention will be described. FIG. 3 is a block diagram of the numerical control device according to the second embodiment of the present invention. The difference between a numerical control device 102 according to the second embodiment of the present invention and the numerical control device 101 according to the first embodiment is, in the ASIC 2, the I/O communication master 22 and the I/O RAM 28 are connected to the first ASIC internal bus 251 on the side of the servo controller 21. The other configurations of the numerical control device 102 according to the second embodiment are the same as those of the numerical control device 101 according to the first embodiment, so a detailed description will be omitted. Just as the first embodiment, a DRAM 31 or a RAM externally connected to the ASIC 2 may be used instead of providing the I/O RAM 28.

As described above, communications of the I/O data between the multicore CPU 1 and the I/O communication master 22 are regarded as periodic transfers, with respect to communications of the servo control data between the multicore CPU 1 and the servo controller 21. Thus, when the communications of the I/O data and the communications of the servo control data are performed through the single high-speed serial interface line 10 and the first ASIC internal bus 251, both the communications can be performed in synchronism with each other. In the second embodiment, communications of the other data, with exception of the servo control data and the I/O data, are performed separately through the high-speed serial interface line 20 and the second ASIC internal bus 252. Therefore, the communications of the I/O data and the communications of the servo control data can be performed synchronously, without requiring any allowance for interruptions by the other communications. Thus, the second embodiment allows a reduction in a communication load between the multicore CPU 1 and each processor other than the servo controller 21, such as the LCDC 24 and the CPU core 25, as compared with the first embodiment.

Next, data transfers by the numerical control device 102 according to the second embodiment of the present invention will be described.

Figure 4:
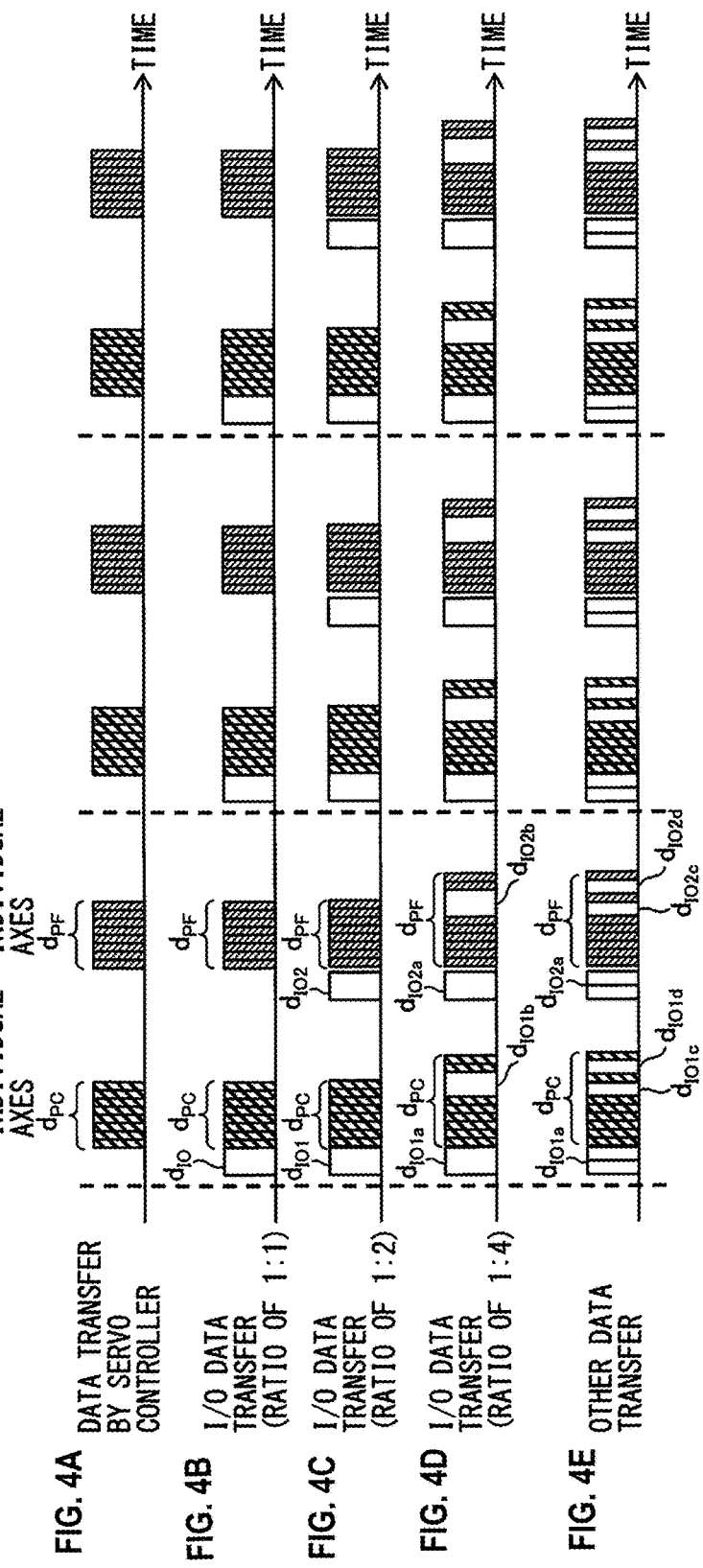
FIGS. 4A to 4E show a timing chart of transfers of servo control data and I/O data in the numerical control device according to the second embodiment of the present invention.

FIGS. 4A to 4E show a timing chart of transfers of the servo control data and transfers of the I/O data in the numerical control device 102 according to the second embodiment of the present invention. FIG. 4A is a timing chart of position command values $d_{PC}$ and position feedback values $d_{PF}$ of the individual axes of the servomotor. FIGS. 4B to 4D are timing charts of the position command values $d_{PC}$ and position feedback values $d_{PF}$ of the individual axes of the servomotor and the I/O (DI/DO) data with periods of 1:1, 1:2, and 1:4, respectively. FIG. 4E is a modification example of the timing chart of FIG. 4D.

As shown in FIG. 4B, for example, when a data transfer $d_{PC}$ and $d_{PF}$ by the servo controller 21 and an I/O data transfer $d_{IO}$ occur at a ratio of 1:1, the transfers are performed without interference. If the transfers interfere, the timing of one of the transfers is shifted relative to the other, or the timing of both of the transfers is shifted so that both of the transfers are completed within a required predetermined time period.

As shown in FIGS. 4C to 4E, when the transfer periods are 1:2 or more, a data transfer $d_{PC}$ and $d_{PF}$ by the servo controller 21 and an I/O data transfer $d_{IO1}$ and $d_{IO2}$ tend to interfere. In this case, as in the case of an example of the transfer period of 1:4 shown in FIG. 4D, the I/O data transfer $d_{IO1b}$ and $d_{IO2b}$ interrupts the servo data transfer $d_{PC}$ and $d_{PF}$. The I/O data transfer $d_{IO1a}$, $d_{IO1b}$, $d_{IO2a}$, and $d_{IO2b}$ has higher priority, and the servo data transfer $d_{PC}$ and $d_{PF}$ is performed after the completion of the I/O data transfer $d_{IO1b}$ and $d_{IO2b}$. Alternatively, the data transfer by the servo controller may have higher priority than the I/O data transfer. As shown in FIG. 4E, the I/O data $d_{IO1b}$ may be divided into $d_{IO1c}$ and $d_{IO1d}$ and transferred. The I/O data $d_{IO2b}$ may be divided into $d_{IO2c}$ and $d_{IO2d}$ and transferred. In this case, which of the I/O data transfer and the servo data transfer has higher priority, or whether or not the I/O data transfers and the servo data transfers are alternately adjusted can be changeable in setting.

As described above, according to the numerical control device 102 of the second embodiment of the present invention, if the I/O communication master 22 is connected to the first ASIC internal bus 251 on the side of the servo controller 21, it is possible to transfer data without delay. Therefore, in the numerical control device 102 according to the second embodiment of the present invention, it is possible to speed up data transfers between the multicore CPU 1 and each processor other than the servo controller 21, while performing the data transfers between the multicore CPU 1 and the servo controller 21 at a high speed.

Third Embodiment

Figure 5:
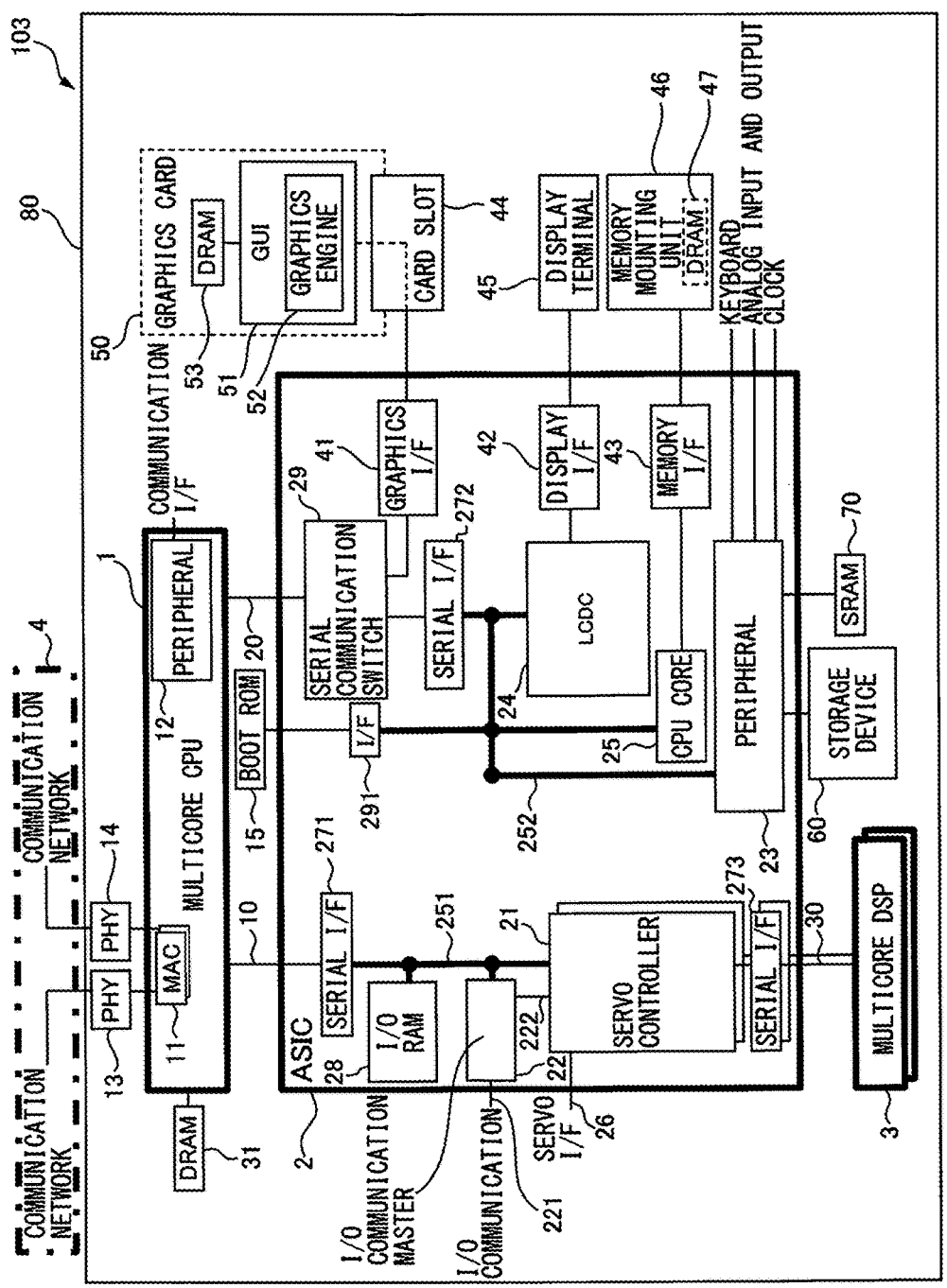
FIG. 5 is a block diagram of a numerical control device according to a third embodiment of the present invention.

Next, a numerical control device according to a third embodiment of the present invention will be described. FIG. 5 is a block diagram of the numerical control device according to the third embodiment of the present invention. The difference between a numerical control device 103 according to the third embodiment of the present invention and the numerical control device 102 according to the second embodiment is, in the ASIC 2, a communication path 222 is provided between the I/O communication master 22 and the servo controller 21. The I/O communication master 22 determines the contents of inputted I/O data. When the I/O data is data to be directly communicated with the servo controller 21, the I/O communication master 22 communicates the I/O data directly to the servo controller 21, instead of to the multicore CPU 1 constituting the main controller. The other configurations of the numerical control device 103 according to the third embodiment are the same as those of the numerical control device 102 according to the second embodiment, so a detailed description is omitted.

I/O signal data (DI) inputted through the I/O communication master 22 is distinguished into a first type of data that is desired to be directly inputted to the servo controller 21 without passing through the multicore CPU 1 and a second type of data including the other.

A first example of the first type of data is a DI signal that makes the servo controller 21 immediately stop the rotation of a specific axis (one or a plurality of axes) designated by the type of the signal, without the mediation of the multicore CPU 1, when the DI signal is inputted from the I/O communication master 22 to the servo controller 21 in a state of rotating the specific axis (one or a plurality of axes).

A second example of the first type of data is a DI signal that makes the servo controller 21 change the rotation speed of a specific axis (one or a plurality of axes) rotating at a constant speed to a value designated by the type of the signal, without the mediation of the multicore CPU 1, when the DI signal is inputted from the I/O communication master 22 to the servo controller 21 in a state of rotating the specific axis (one or a plurality of axes) at the constant speed. The relationship between the type of DI signal and a rotation speed is predetermined in the servo controller 21 before starting operation.

A third example of the first type of data is a DI signal that makes the servo controller 21 move a stopped axis (one or a plurality of axes) to a specific position at a maximum speed achieved with a specific maximum acceleration or deceleration and position the axis therein, without the mediation of the multicore CPU 1, when the DI signal is inputted from the I/O communication master 22 to the servo controller 21 in a state of stopping the specific axis (one or a plurality of axes). The position, the maximum acceleration and deceleration, and the maximum speed are set in advance in the servo controller 21 before starting operation. A plurality of positions and a plurality of maximum speeds, corresponding to a plurality of DI signals, may be set.

A first example of the second type of data is a DI signal that designates a processing program stored in the storage device or the like in advance. Such a DI signal is transmitted from the I/O communication master 22 to the multicore CPU 1. The multicore CPU 1 generates a move command value for the servo controller 21 using the designated processing program, and transmits the move command value to the servo controller 21.

A second example of the second type of data is data in the case of simultaneously performing contouring control (interpolation process) of a plurality of axes. In this case, a slave unit (servo control IC) for controlling another axis is connected to an I/O communication interface 221 of the I/O communication master 22, and the I/O communication master 22 receives data from the slave unit. This data is required to be processed integrally with data from the servo controller 21 in the main controller of the multicore CPU 1.

The distinction between the first type of data and the second type of data is made using a distinction table provided in the I/O communication master 22. In this table, signals to be treated as the first type of data are designated by an address and a bit of the I/O RAM in which the signals are to be stored, and the first and second types of signals are distinguished based on the table. Instead of the address and the bit, the type of the slave unit connected to the I/O communication interface and a connector terminal provided in the unit may be used. The designation in the distinction table is arbitrarily changeable by a user of the numerical control device.

In the third embodiment, the I/O communication master 22 identifies whether or not a DI signal is the first type of data. When the DI signal is the first type of data, the DI signal is transmitted to the servo controller 21 through the communication path 222. When the DI signal is the second type of data, the DI signal is transmitted to the multicore CPU 1 through the first ASIC internal bus 251, the serial interface 271, and the high-speed serial interface line 10. Note that, there is some of the first type of data that should be managed in the multicore CPU 1 for overall control. Such first type of data is transmitted to the servo controller 21 through the communication path 222, and thereafter may be appropriately transmitted to the multicore CPU 1 through the first ASIC internal bus 251, the serial interface 271, and the high-speed serial interface line 10.

The third embodiment enables a reduction in time between the reception of the first type of data by the I/O communication master 22 and the reception of the first type of data by the servo controller 21. Thus, this embodiment is advantageous, specifically when the first type of data requires urgency or responsivity.

Fourth Embodiment

Figure 6:
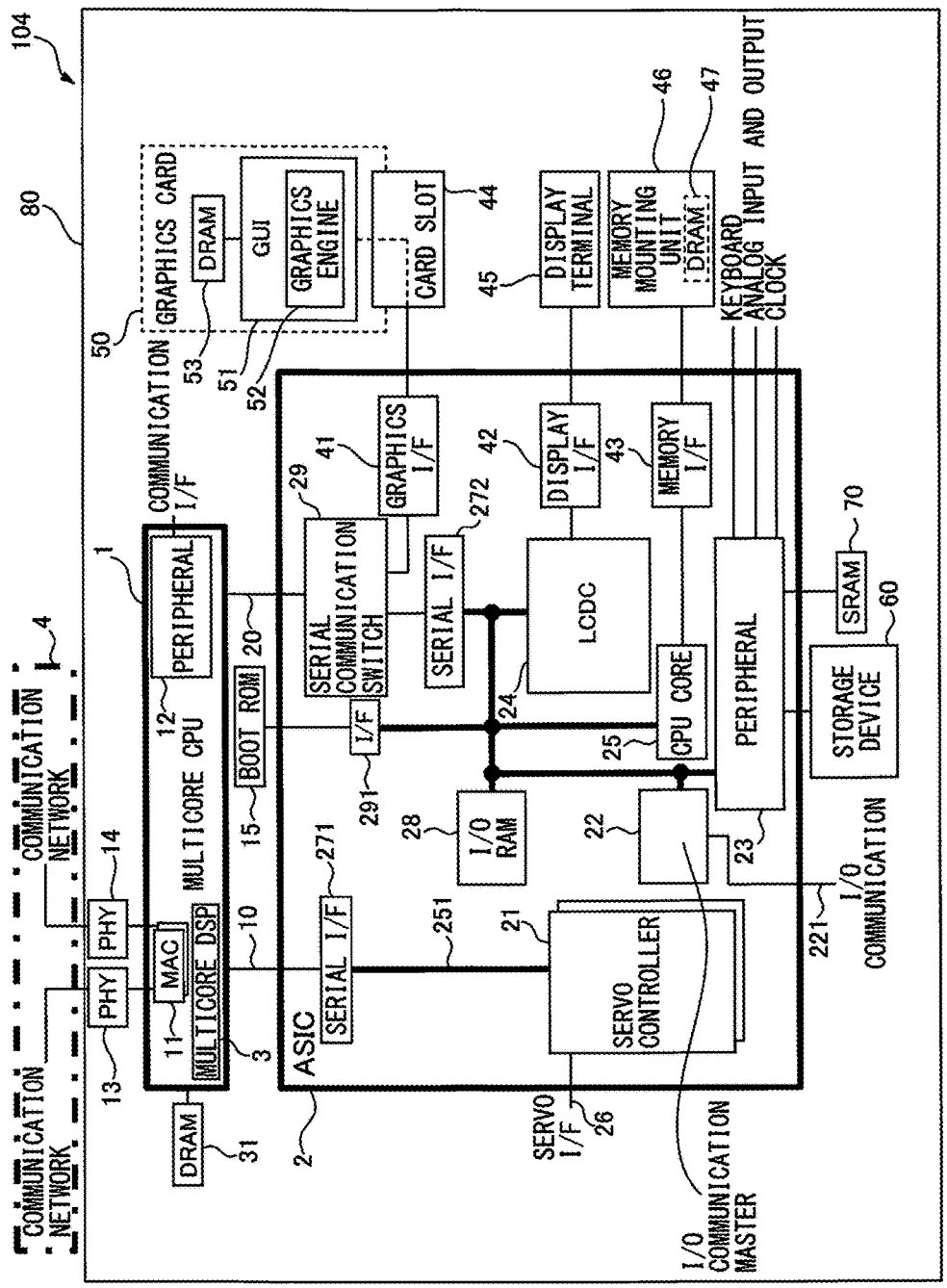
FIG. 6 is a block diagram of a numerical control device according to a fourth embodiment of the present invention.

Next, a numerical control device according to a fourth embodiment of the present invention will be described. FIG. 6 is a block diagram of the numerical control device according to the fourth embodiment of the present invention. The difference between a numerical control device 104 according to the fourth embodiment of the present invention and the numerical control device 101 according to the first embodiment is that the multicore DSP 3 is contained in the multicore CPU 1, and the serial interface 273 is removed thereby. The other configurations of the numerical control device 104 according to the fourth embodiment are the same as those of the numerical control device 101 according to the first embodiment, so a detailed description will be omitted.

In the fourth embodiment, since a DSP core 3 is contained in the multicore CPU 1, a move command value is not written to the servo controller 21 as in the case of the first embodiment, but written to the DRAM 31 connected to the multicore CPU 1 or a cache in the CPU. The DSP core 3 accesses the DRAM 31 or the cache, and data is exchanged between the DSP core 3 and the CPU core constituting the main controller of the multicore CPU 1.

The DSP core 3 generates a current command value for the amplifier from the move command value, and transmits the current command value to the servo controller 21 through the high-speed serial interface line 10, the serial interface 271, and the first ASIC internal bus 251. The servo controller 21 transmits the current command value to the servo amplifier through the servo interface. Also, the value of the current sensor and the value of the motor feedback signal obtained through the servo interface are written to the servo controller 21. The DSP core 3 calculates the next current control command value based on the value of the current sensor and the value of the feedback signal written to the servo controller 21 through the high-speed serial interface line 10, the serial interface 271, and the first ASIC internal bus 251.

According to the numerical control device of the fourth embodiment, since the main controller and the PLC are configured by the CPU cores in the multicore CPU 1, and the DSP 3 is contained in the multicore CPU 1, the main controller, the PLC, and the DSP 3 can be mutually and closely communicated, thus improving responsivity in the servo control. Also, the numerical control device according to the fourth embodiment can eliminate the need for providing the high-speed serial interface line 30 and the serial interface 273 provided in the first embodiment.

The numerical control device according to the present invention can improve servo control performance by eliminating communication performance degradation owing to a bus, thus allowing for providing the numerical control device having improved servo control performance.

Based on the above description, the following configurations are achievable in the embodiments.

[Configuration 1]

A numerical control device including:

a CPU for outputting a position command value of a servomotor;

an integrated circuit including a servo controller for outputting a current command value to an amplifier for driving the servomotor, and another processor; and a DSP for reading the position command value and controlling the servomotor such that the servomotor moves to a position indicated by the position command value, wherein the CPU and the integrated circuit are connected through a plurality of serial interfaces, the integrated circuit has a first internal bus connected to one of the plurality of serial interfaces, and a second internal bus connected to another one of the plurality of serial interfaces, the servo controller is connected to the first internal bus, and the other processor is connected to the second internal bus.

[Configuration 2]

The numerical control device according to the configuration 1, wherein the integrated circuit further includes an I/O communication unit, and the I/O communication unit is connected to the first internal bus.

[Configuration 3]

The numerical control device according to the configuration 2, wherein the I/O communication unit is connected to the servo controller through an internal communication path through which a signal is directly transmitted;

the I/O communication unit distinguishes between a first type of data to be communicated directly with the servo controller without passing through the CPU and a second type of data to be communicated with the servo controller through the CPU, and when data is distinguished to be the first type of data, the I/O communication unit transmits the first type of data to the servo controller through the internal communication path.

[Configuration 4]

The numerical control device according to the configuration 1, wherein the integrated circuit further includes an I/O communication unit, and the I/O communication unit is connected to the second internal bus.

[Configuration 5]

The numerical control device according to any one of the configurations 1 to 4, wherein the CPU is a multicore CPU having a plurality of cores, and a part of the plurality of cores are assigned to a servo control, while the remaining cores are assigned to another control.

[Configuration 6]

The numerical control device according to any one of the configurations 1 to 5, wherein the CPU writes the position command value to the servo controller, the CPU reads a feedback signal of the servo motor from the servo controller, the DSP reads the position command value written by the CPU, and controls the servomotor through a servo interface, and a feedback value of the servomotor obtained through the servo interface is written to the servo controller.

[Configuration 7]

The numerical control device according to any one of the configurations 1 to 5, wherein the DSP is provided in the CPU, the CPU writes the position command value to a memory that the CPU and the DSP are directly accessible, the DSP reads the position command value written by the CPU, and controls the servomotor through the servo controller and a servo interface, and a feedback value of the servomotor obtained through the servo interface and the servo controller is written to the memory that the CPU and the DSP are directly accessible.

[Configuration 8]

The numerical control device according to any one of the configurations 1 to 7, wherein the other processor includes a peripheral controller for controlling at least a peripheral device and a display controller having a display interface with the outside.

[Configuration 9]

The numerical control device according to the configuration 8, further including:

a core unit connected to the second internal bus, for performing a process associated with at least a display function; and a memory interface connected to a working memory outside the integrated circuit.

[Configuration 10]

The numerical control device according to the configuration 8 or 9, further including:

a serial communication switch for inputting and outputting a communication with the serial interface connected to the second internal bus, while distinguishing the communication between a first address communication and a second address communication in accordance with an address;

a serial interface for connecting the first address communication to the second internal bus; and a graphics interface connected to the second address communication and a graphics card outside the integrated circuit.

[Configuration 11]

The numerical control device according to the configuration 10, further including a control circuit board on which the CPU, the integrated circuit, the DSP, a card slot for installing the graphics card connected to the graphics interface, and a display terminal connected to the display interface are mounted.

[Configuration 12]

The numerical control device according to any one of the configurations 1 to 7, wherein the other processor further includes:

a peripheral controller for controlling at least a peripheral device;

a display controller having a display interface with the outside;

a core unit for performing a process associated with at least a display function;

a memory interface connected to a working memory outside the integrated circuit;

a serial communication switch for inputting and outputting a communication with the serial interface connected to the second internal bus, while distinguishing the communication between a first address communication and a second address communication in accordance with an address;

a serial interface for connecting the first address communication to the second internal bus; and a graphics interface connected to the second address communication and a graphics card outside the integrated circuit, and the numerical control device includes a control circuit board on which the CPU, the integrated circuit, the DSP, a card slot for installing the graphics card connected to the graphics interface, a display terminal connected to the display interface, and a memory mounting unit connected to the memory interface are mounted.

The embodiments of the present invention are described above, but as a matter of course, may include various modification examples. For example, which functional unit is integrated into each IC and which functional unit is connected to each of the plurality of buses in the ASIC should be appropriately determined in accordance with specifications, and various modification examples take place in accordance therewith.

What is claimed is:

1. A numerical control device comprising:
   a CPU for outputting a position command value of a servomotor;
   an integrated circuit including a servo controller for outputting a current command value to an amplifier for driving the servomotor, and another processor; and
   a DSP for reading the position command value and controlling the servomotor such that the servomotor moves to a position indicated by the position command value, wherein
   the CPU and the integrated circuit are connected through a plurality of serial interfaces,
   the integrated circuit has a first integrated circuit internal bus connected to one of the plurality of serial interfaces, and a second integrated circuit internal bus connected to another one of the plurality of serial interfaces,
   the servo controller is connected to the first integrated circuit internal bus, and
   the other processor is connected to the second integrated circuit internal bus.

2. The numerical control device according to claim 1, wherein
   the integrated circuit further includes an I/O communication unit, and
   the I/O communication unit is connected to the first integrated circuit internal bus.

3. The numerical control device according to claim 1, wherein
   the CPU is a multicore CPU having a plurality of cores, and
   a part of the plurality of cores are assigned to a servo control, while the remaining cores are assigned to another control.

4. The numerical control device according to claim 1, wherein
   the CPU writes the position command value to the servo controller,
   the CPU reads a feedback signal of the servo motor from the servo controller,
   the DSP reads the position command value written by the CPU, and controls the servomotor through a servo interface, and
   a feedback value of the servomotor obtained through the servo interface is written to the servo controller.

5. The numerical control device according to claim 1, wherein
   the DSP is provided in the CPU,
   the CPU writes the position command value to a memory that the CPU and the DSP are directly accessible,
   the DSP reads the position command value written by the CPU, and controls the servomotor through the servo controller and a servo interface, and
   a feedback value of the servomotor obtained through the servo interface and the servo controller is written to the memory that the CPU and the DSP are directly accessible.

6. The numerical control device according to claim 2, wherein
   the I/O communication unit is connected to the servo controller through an internal communication path through which a signal is directly transmitted;
   the I/O communication unit distinguishes between a first type of data to be communicated directly with the servo controller without passing through the CPU and a second type of data to be communicated with the servo controller through the CPU, and
   when data is distinguished to be the first type of data, the I/O communication unit transmits the first type of data to the servo controller through the internal communication path.

7. The numerical control device according to claim 1, wherein the other processor includes a peripheral controller for controlling at least a peripheral device and a display controller having a display interface with the outside.

8. The numerical control device according to claim 7, further comprising:
   a serial communication switch for inputting and outputting a communication with the serial interface connected to the second integrated circuit internal bus, while distinguishing the communication between a first address communication and a second address communication in accordance with an address;
   a serial interface for connecting the first address communication to the second integrated circuit internal bus; and
   a graphics interface connected to the second address communication and a graphics card outside the integrated circuit.

9. The numerical control device according to claim 8, further comprising:
   a core unit connected to the second integrated circuit internal bus, for performing a process associated with at least a display function; and
   a memory interface connected to a working memory outside the integrated circuit.

10. The numerical control device according to claim 9, further comprising a control circuit board on which the CPU, the integrated circuit, the DSP, a card slot for installing the graphics card connected to the graphics interface, a display terminal connected to the display interface, and a memory mounting unit connected to the memory interface are mounted.

* * * * *